Figure 1:
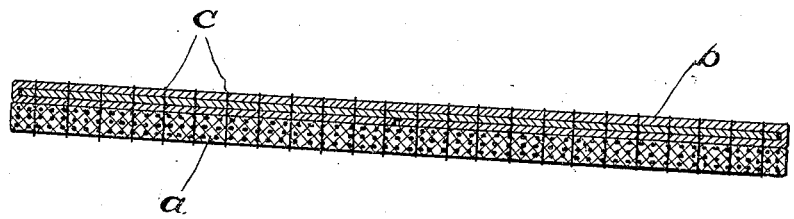

No. 869,935.

G. C. PLUMMER.
CONVEYER BELT.
APPLICATION FILED APR. 10, 1907.

PATENTED NOV. 5, 1907.

WITNESSES:

INVENTOR
George C. Plummer
BY
ATTORNEYS.

UNITED STATES PATENT OFFICE.

GEORGE C. PLUMMER, OF PHILADELPHIA, PENNSYLVANIA, ASSIGNOR TO MAIN BELTING COMPANY, OF PHILADELPHIA, PENNSYLVANIA, A CORPORATION OF PENNSYLVANIA.

CONVEYER-BELT.

No. 869,935.

Specification of Letters Patent.

Patented Nov. 5, 1907.

Application filed April 10, 1907. Serial No. 367,306.

*To all whom it may concern:*

Be it known that I, GEORGE C. PLUMMER, a citizen of the United States, residing at Philadelphia, county of Philadelphia, and State of Pennsylvania, have invented a new and useful Improvement in Conveyer-Belts, of which the following is a full, clear, and exact description, reference being had to the accompanying drawings, which form a part of this specification.

For the purpose of carrying or conveying materials such as grain, sand, stone, coal, wood, bark, etc., belts are often used. In order to properly hold the materials, the belts are often curved or, what is termed "troughed". This "troughing" may be produced by guides which travel with the belt, or, may be produced by inclined or concaved rollers over which the belt passes.

In all cases the desideratum for troughing is a flexible belt, with a wearing surface of such character as to resist abrasion. For this purpose rubber, stitched canvas, leather, and woven belts have been used. The rubber belt is not wholly effective in that when the rubber gives way from wear, the belt quickly goes to pieces. Leather belts are too expensive and, moreover, are unable to resist much of the wear and tear of conveying. Stitched canvas belts do not have the required flexibility when designed for heavy loads. "Solid woven belts" have flexibility to the desired extent but they are weak in that their working surfaces are easily cut away so that under the abrasion of the materials carried, they soon wear out. Attempts have been made to reinforce such belts with a rubber carrying face. This has been found inefficient as the rubber soon cracks or peels off, exposing the woven body of the belting which is soon cut away, the belt then wearing out as the ordinary "solid woven belt" does.

The object of my invention is to produce a belt in which the feature of "the solid woven belt", of flexibility to the highest extent and capacity for troughing, is taken advantage of, while its defects are removed. A "solid woven belt" is a well known article of manufacture comprised of a plurality of plies or layers of warp and weft threads woven and interbound together.

My invention consists in a belt, the body of which is formed of a "solid woven belt", and the carrying surface of which is formed of canvas or duck secured to said "solid woven belt". A single layer or a plurality of layers of canvas or duck may be used and it may be secured to the woven belt by stitching or by rivets or staples, or by "frictioning" as rubber belts are put together.

To produce my improved belt, I take a solid woven belt of the desired number of plies (thickness) and to this belt I attach a wearing surface of duck, of cotton or other material. This wearing surface may be of one, or a plurality of layers of said duck. By this arrangement I obtain a belt having a wearing surface capable of resisting abrasion and having a flexible body.

Figure 2:
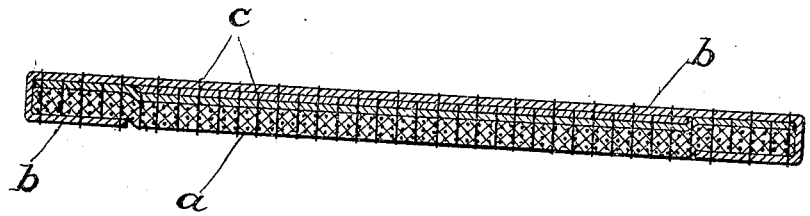
Figure 3:
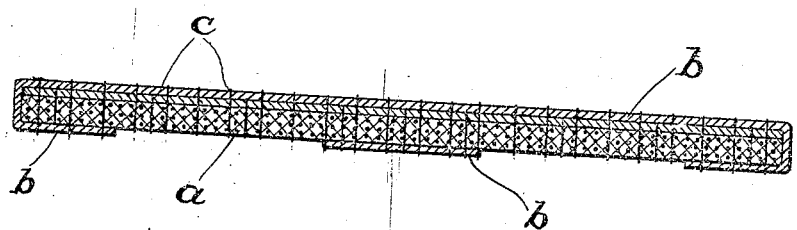
Figure 4:
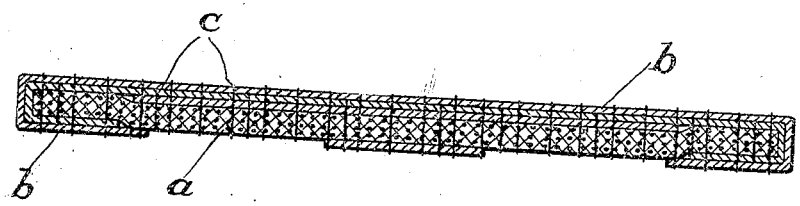

I will now describe the embodiment of my invention shown in the accompanying drawings:

In the drawings: Figure 1 is a transverse section of a belt embodying my invention. Fig. 2 is a transverse section of another belt embodying my invention. Fig. 3 is a transverse section of another belt embodying my invention. Fig. 4 is a transverse section of another belt embodying my invention.

In all the drawings, $a$ is the solid woven belt and $b$ is the duck or canvas and $c$ is stitching shown for securing the duck and solid woven belt together.

In Fig. 1 the wearing duck surface $b$ is of uniform thickness over the width of the belt $a$ and three layers of duck are shown, although, of course, a greater or lesser number may be used.

The construction of Fig. 2 is similar to that of Fig. 1, except that the top layer of duck $b$ is brought around the edges of the solid woven belt $a$. This gives a surface of wear resisting duck over the edges of the woven belt, as it is often desirable to provide wear resistance at this point.

The construction of Fig. 3 differs from Fig. 2 in that two layers of duck $b$ are used over the whole face of the solid woven belt $a$ and an extra layer of duck $b$ is applied underneath at the central portion. This is desirable in that in conveying the central portion of the belt supports the major portion of the load and consequently with a heavy load, it may sometimes be desirable to provide here a maximum wear resisting quality. It is also sometimes desirable to protect the under face of the solid woven belt where it may abrade or rub against the carrying rollers. I therefore, as shown in Fig. 3, place a strip of duck $b$, on the lower face of the solid woven belt, at this point, for this purpose.

The construction of Fig. 4 differs from Fig. 3 in that the two upper layers of duck $b$ are brought around the edges of the woven belt $a$.

As I have stated, instead of stitches I can use rivets or staples or "frictioning" to secure the layers of duck together and to the solid woven belt,—the particular means used to secure the layers of duck together and to the solid woven belt not being essential to my invention. I can also, if desired, impregnate my belt with any material now used with other belts. I may also initially toughen the belt by such means as paint or oil. I do not limit myself to any particular material for the duck strip or for the solid woven belt.

Having now fully described my invention, what I claim and desire to protect by Letters Patent is:

1. A conveyer belt comprising a solid woven body, having secured to the face thereof one or more layers of a wear resisting fabric constructed of animal or vegetable fibers.

2. A belt comprising a solid woven body having secured to the face thereof one or more layers of duck.

3. A conveyer belt comprising a solid woven body, having secured to the faces thereof one or more layers of a wear resisting fabric constructed of animal or vegetable fibers.

4. A conveyer belt comprising a solid woven body, having secured to the faces thereof one or more layers of duck.

5. A conveyer belt comprising a solid woven body, having secured to its edges a wear resisting fabric.

6. A conveyer belt comprising a solid woven body, having secured to its edges one or more layers of duck.

7. A conveyer belt comprising a solid woven fabric, having secured to the central portion of its face a plurality of layers of wear resisting fabric, and a lesser number of layers throughout the remainder of the face.

8. A conveyer belt comprising a solid woven fabric, having secured to the central portion of its face a plurality of layers of duck, and a lesser number of layers throughout the remainder of the face.

9. A conveyer belt comprising a solid woven fabric, having secured to the portion of the face adapted to travel over the idlers one or more layers of wear resisting fabric.

10. A conveyer belt comprising a solid woven fabric, having secured to the portion of the face adapted to travel over the idlers one or more layers of duck.

11. A conveyer belt comprising a solid woven fabric, having on one face one or more layers of wear resisting fabric, and on the other face, at the portion adapted to travel against the idlers, one or more layers of wear resisting fabric.

12. A conveyer belt comprising a solid woven fabric, having on one face one or more layers of duck, and on the other face, at the portion adapted to travel against the idlers, one or more layers of duck.

In testimony of which invention, I have hereunto set my hand, at Philadelphia, on this 5th day of April, 1907.

GEORGE C. PLUMMER.

Witnesses:
 M. M. HAMILTON,
 A. M. URIAN.